(12) United States Patent        (10) Patent No.:     US 7,812,906 B2
Eguchi                            (45) Date of Patent:     Oct. 12, 2010

(54) LIQUID CRYSTAL DEVICE AND ELECTRONIC APPARATUS

(75) Inventor: Tsukasa Eguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 104 days.

(21) Appl. No.: 12/105,886

(22) Filed: Apr. 18, 2008

(65) Prior Publication Data

US 2008/0297709 A1    Dec. 4, 2008

(30) Foreign Application Priority Data

May 29, 2007    (JP)    ............................. 2007-141387

(51) Int. Cl.
    *G02F 1/133*    (2006.01)
    *G06F 3/042*    (2006.01)
(52) U.S. Cl. ...................... 349/116; 345/175
(58) Field of Classification Search ................. 349/116; 345/175

See application file for complete search history.

(56) References Cited

U.S. PATENT DOCUMENTS

| 6,028,581 | A  | * | 2/2000  | Umeya          | 345/104 |
| 7,242,449 | B1 | * | 7/2007  | Yamazaki et al. | 349/116 |
| 7,286,173 | B2 | * | 10/2007 | Zhang et al.   | 348/294 |
| 2006/0109260 | A1 | * | 5/2006 | Sui et al.     | 345/175 |

FOREIGN PATENT DOCUMENTS

| JP | 06-276352 A   | 9/1994 |
| JP | 2006-003857 A | 1/2006 |
| JP | 2006-209065 A | 8/2006 |

OTHER PUBLICATIONS

Nishibe et al., "Value-Added SOG (System-on-Glass) Display Based on LTPS Technology," Active-Matrix Flat-Panel Displays and Devices 2006 Digest, pp. 61-64.

* cited by examiner

*Primary Examiner*—Jerry T Rahll
(74) *Attorney, Agent, or Firm*—Lowe Hauptman Ham & Berner LLP

(57) ABSTRACT

The invention provides a liquid crystal device that includes: a first substrate; a second substrate that is provided over the first substrate in such a manner that the first substrate and the second substrate face each other; a transparent pixel electrode that is provided in each of a plurality of pixels that constitute a display area over the first substrate; a transparent common electrode that is formed over the first substrate; a liquid crystal layer that is sandwiched between the first substrate and the second substrate, the liquid crystal layer containing liquid crystal molecules that are driven by a horizontal electric field that is generated in accordance with a difference between the electric potential of the pixel electrode and the electric potential of the common electrode; and a light-sensitive pickup element that is formed in the display area over the first substrate, the light-sensitive pickup element having an upper electrode that is formed in the same layer as that of either the pixel electrode or the common electrode.

7 Claims, 12 Drawing Sheets

LIQUID CRYSTAL DEVICE AND ELECTRONIC APPARATUS

RELATED APPLICATIONS

The present application is based on, and claims priority from, Japan Application Number 2007-141387, filed May 29, 2007, the disclosure of which is hereby incorporated by reference herein in its entirety.

BACKGROUND

1. Technical Field

The present invention relates to a display device having an input sensing function such as a touch-panel-type liquid crystal device. In addition, the invention further relates to an electronic apparatus that is provided with such a display device.

2. Related Art

In the technical field to which the present invention pertains, a variety of display devices having a so-called touch panel input function has been proposed so far. In the configuration of a touch-panel-type liquid crystal device, which is an example of such a display device having a touch panel input function, an optical sensor (i.e., light sensor, photo sensor) is provided for either each of a plurality of pixel units or each of a plurality of groups of pixel units, where each group thereof is made up of a given number of pixel units. With such a configuration, in addition to its basic function of displaying an image by using light that transmits through the pixel units, a liquid crystal device having a touch panel function of the related art allows a user to input information by means of a pointing means (In the following description, the pointing means may be referred to as a "pointing object" with no intention to limit the technical scope of the invention as long as the context allows). The liquid crystal device having a touch panel function of the related art allows a user to input information through the functioning of photo detectors, which are light-sensitive pickup elements. Specifically, the photo detectors such as optical sensors detect either the touching of a variety of pointing objects such as a finger of a user or other pointing member, though not limited thereto, onto the display surface of the liquid crystal device or the moving of such a pointing object over the display surface of the liquid crystal device. By this means, the user can input information into the liquid crystal device.

Some touch-panel-type liquid crystal devices of the related art adopt a horizontal electric-field scheme for the driving of liquid crystal thereof. Specifically, in the horizontal electric-field driving scheme, a horizontal electric field that is generated between pixel electrodes and a common electrode is used for the driving of liquid crystal, where the pixel electrodes are formed on a certain layer over a TFT array substrate whereas the common electrode is formed on another layer over the TFT array substrate. In such a touch-panel-type liquid crystal device of the related art, thin film transistors (TFT), each of which functions as a pixel-switching element, are formed on the TFT array substrate thereof. Examples of the touch-panel-type liquid crystal devices of the related art are described in, for example, the following patent documents: JP-A-2006-209065, JP-A-2006-003857, and JP-A-6-276352. A further example of the touch-panel-type liquid crystal device of the related art is described in, for example, a non-patent document of "ACTIVE-MATRIX FLAT-PANEL DISPLAYS AND DEVICES 2006 Digest", page 61, Toshiba Matsushita Display Technology Co., Ltd.

A touch-panel-type liquid crystal device of the related art has a disadvantage in that, since it has a complex lamination/layer structure that is formed on the TFT array substrate thereof, it is not practically possible, or at best difficult, to secure a sufficient amount of light that reaches each of optical sensors thereof. Therefore, as a disadvantage of the touch-panel-type liquid crystal device of the related art, it is not possible to ensure a good sensitivity in the detection of a pointing object that is performed by the optical sensors thereof. In addition to such a disadvantage, if electrodes for optical sensors are formed in a manufacturing process that is not the same as the formation process for other components thereof, for example, without any intention of limitation thereto, in the formation of data lines each through/on which a signal is supplied from a circuitry such as a data-line driving circuit, etc., so as to display images, which is the fundamental function of a liquid crystal device, it is inevitable that the manufacturing process of the liquid crystal device will be complex, thereby resulting in an undesirably high cost of production thereof. Moreover, if electrodes for optical sensors are formed in a discreet manner, that is, separately from other components thereof such as data lines and the like, it is inevitable that the open area of a pixel will be narrow. Such a narrow open region of a pixel inevitably degrades the quality of a display image.

SUMMARY

An advantage of some aspects of the invention is to provide a liquid crystal device that is capable of offering an enhanced sensitivity in the detection of a pointing means that is performed by optical sensors thereof without sacrificing the performance and quality of image display. In addition, the invention further provides, as an advantage of some aspects thereof, an electronic apparatus that is provided with such a liquid crystal device.

In order to address the above-identified problem without any limitation thereto, the invention provides, as a first aspect thereof, a liquid crystal device including: a first substrate; a second substrate that is provided over the first substrate in such a manner that the first substrate and the second substrate face each other; a transparent pixel electrode that is provided in each of a plurality of pixels that constitute a display area over the first substrate; a transparent common electrode that is formed over the first substrate; a liquid crystal layer that is sandwiched between the first substrate and the second substrate, the liquid crystal layer containing liquid crystal molecules that are driven by a horizontal electric field that is generated in accordance with a difference between the electric potential of the pixel electrode and the electric potential of the common electrode; and a light-sensitive pickup element that is formed in the display area over the first substrate, the light-sensitive pickup element having an upper electrode that is formed in the same layer as that of either the pixel electrode or the common electrode.

With such a configuration, when the liquid crystal device according to the first aspect of the invention is operated, the orientation, that is, alignment, of the liquid crystal layer thereof is controlled by means of a horizontal electric field that is generated in accordance with a difference between the electric potential of the pixel electrode and the electric potential of the common electrode that are formed over the first substrate. As the result of orientation/alignment control of the liquid crystal layer thereof, light that is emitted from a light source is modulated. By this means, a desired image is displayed on the display area thereof as the result of such optical modulation. Herein, the term "common electrode" refers to an electrode that is maintained at a fixed electric potential. On the other hand, the term "pixel electrode" refers to an electrode that is maintained at an electric potential that corresponds to an image signal supplied thereto from circuitry units such as a data line driving circuit, though not limited thereto, via a variety of wirings such as a data line, though not limited thereto.

The light-sensitive pickup element is formed in the display area over the first substrate. The light-sensitive pickup element has an upper electrode that is formed in the same layer as that of either the pixel electrode or the common electrode. The light-sensitive pickup element is capable of detecting reflected light, which has been reflected by a pointing means (i.e., pointing object) such as a finger of a user or the like that points to the display surface in the image display area of the liquid crystal device, or external/incident light that comes from the outside without being blocked/shielded by the pointing means. On the basis of detected light, the light-sensitive pickup element detects the pointing means.

The light-sensitive pickup element is an optical sensor such as a photodiode or the like that is made up of an element body and a pair of electrodes. The element body of the light-sensitive pickup element is made up of an N-type semiconductor layer, a low resistance layer, and a P-type semiconductor layer, which are deposited in a sequential manner over the first substrate. The pair of electrodes is electrically connected to the element body of the light-sensitive pickup element. One of the pair of electrodes that is formed over the element body of the light-sensitive pickup element constitutes an upper electrode. The upper electrode is configured so as to contact, for example, the P-type semiconductor layer, which is the uppermost layer of the element body.

Each of the pixel electrode and the common electrode is configured as a transparent electrode that is made of Indium Tin Oxide (ITO). The pixel electrode is formed in a certain layer over the first substrate that is not the same as that of the common electrode. The light-sensitive pickup element has an upper electrode that is formed in the same layer as that of either the pixel electrode or the common electrode. Therefore, in the manufacturing process of the liquid crystal device according to the first aspect of the invention, it is possible to form the upper electrode of the light-sensitive pickup element and either the pixel electrode or the common electrode in the same single electrode formation process. Therefore, in comparison with a case where the upper electrode of the light-sensitive pickup element is manufactured in one electrode formation process whereas the pixel/common electrode is manufactured in another electrode formation process, the invention makes it possible to simplify the process of manufacturing the liquid crystal device.

The upper electrode of the light-sensitive pickup element has transparency because each of the pixel electrode and the common electrode is configured as a transparent electrode that is made of ITO or the like. Being made of a transparent electrode, neither the pixel electrode nor the common electrode narrows an open region (i.e., open area) over the first substrate, which is an active area in each pixel through which light can be transmitted for image display without being shut off thereby. Moreover, incident light that has passed through the display surface reaches the element body of the light-sensitive pickup element, which functions as a light reception unit thereof, without being shut off by the upper electrode thereof. Therefore, the liquid crystal device according to the first aspect of the invention is capable of offering an enhanced sensitivity in the detection of a pointing means that is performed by the light-sensitive pickup element thereof without sacrificing the performance and quality of image display.

The "open region" is demarcated by opaque films, wirings, and the like that are formed over the first substrate. The open region is an area in each pixel through which light that actually contributes to image display can be transmitted, or an area that contributes to a reflective-mode display by utilizing external light coming from the outside. On the other hand, an area through which light cannot be transmitted because of the presence of opaque films, wirings, and the like that are formed in each pixel over the first substrate, that is, an area that does not contribute to image display, is refereed to as "non-open region".

To sum it up, the liquid crystal device according to the first aspect of the invention offers the following advantageous effects of the invention, though not necessarily limited thereto; that is, in addition to the advantage of its simpler manufacturing process, the liquid crystal device according to the first aspect of the invention is capable of offering an enhanced sensitivity in the detection, which is performed by the light-sensitive pickup element thereof, of external light (i.e., incident light) that comes from the outside without being blocked/shielded by the pointing means that points to the display surface and/or light that has been reflected by the pointing means without sacrificing the performance and quality of image display because an open active area in each pixel through which light can be transmitted for image display is not narrowed.

In the configuration of a liquid crystal device according to the first aspect of the invention described above, it is preferable that the upper electrode should be formed in the same layer as that of the common electrode.

With such a preferred configuration, it is possible to form the upper electrode of the light-sensitive pickup element in an easier manner in comparison with a case where the upper electrode thereof is formed in the same layer as that of the pixel electrode.

In the configuration of a liquid crystal device according to the first aspect of the invention described above, it is preferable that the light-sensitive pickup element should have a lower electrode that is formed in the same layer as that of an electro-conductive layer that is electrically connected to a pixel-switching element.

The liquid crystal device having a preferred configuration described above offers a more (i.e., further) simplified and thus efficient production process because it is possible to manufacture the lower electrode of the light-sensitive pickup element in (i.e., by utilizing) the formation process of the electro-conductive layer.

In the configuration of a liquid crystal device according to the first aspect of the invention described above, it is preferable that the lower electrode of the light-sensitive pickup element should have an additional function of (i.e., should double as) a light-shielding film that shuts off light-source light that is emitted from a light source provided under the light-sensitive pickup element.

With such a preferred configuration, thanks to the presence of the light-shielding lower electrode thereof, it is possible to significantly reduce any undesirable irradiation of light coming from the light source onto the light-sensitive pickup element at the time of display of an image in the display area thereof. Thus, the liquid crystal device having such a preferred configuration ensures the accurate detection of a pointing object (i.e., pointing means) by means of the light-sensitive pickup element thereof.

In order to address the above-identified problem without any limitation thereto, the invention provides, as a second aspect thereof, an electronic apparatus that is provided with the liquid crystal device according to the first aspect of the invention described above.

According to an electronic apparatus of this aspect of the invention, it is possible to embody various kinds of electronic devices that has a touch panel input function and are capable of providing a high-quality image display, including but not limited to, a mobile phone, an electronic personal organizer, a word processor, a viewfinder-type video recorder, a direct-monitor-view-type video tape recorder, a workstation, a videophone, a POS terminal, and so forth, because the electronic apparatus of this aspect of the invention is provided with the liquid crystal device according to the above-described aspect of the invention. In addition, as an example of an electronic apparatus of this aspect of the invention, it is possible to embody an electrophoresis apparatus such as an electronic paper.

These and other features, operations, and advantages of the present invention will be fully understood by referring to the following detailed description in conjunction with the accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the accompanying drawings, the configuration and operation of a liquid crystal device according to an exemplary embodiment of the invention is explained below. In addition, an electronic apparatus that is provided with such a liquid crystal device according to an exemplary embodiment of the invention is also explained below. A liquid crystal device according to the present embodiment of the invention has a touch panel function that allows a user to input a variety of kinds of information by using a pointing means as an inputting object. Specifically, the liquid crystal device according to the present embodiment of the invention is capable of detecting a pointing means such as a finger of a user, though not limited thereto, which points to an image display surface on which an image is displayed, thereby allowing a user to input a variety of kinds of information by using the pointing means as an inputting object.

1: First Embodiment 1-1: General Configuration of Liquid Crystal Device

Figure 1:
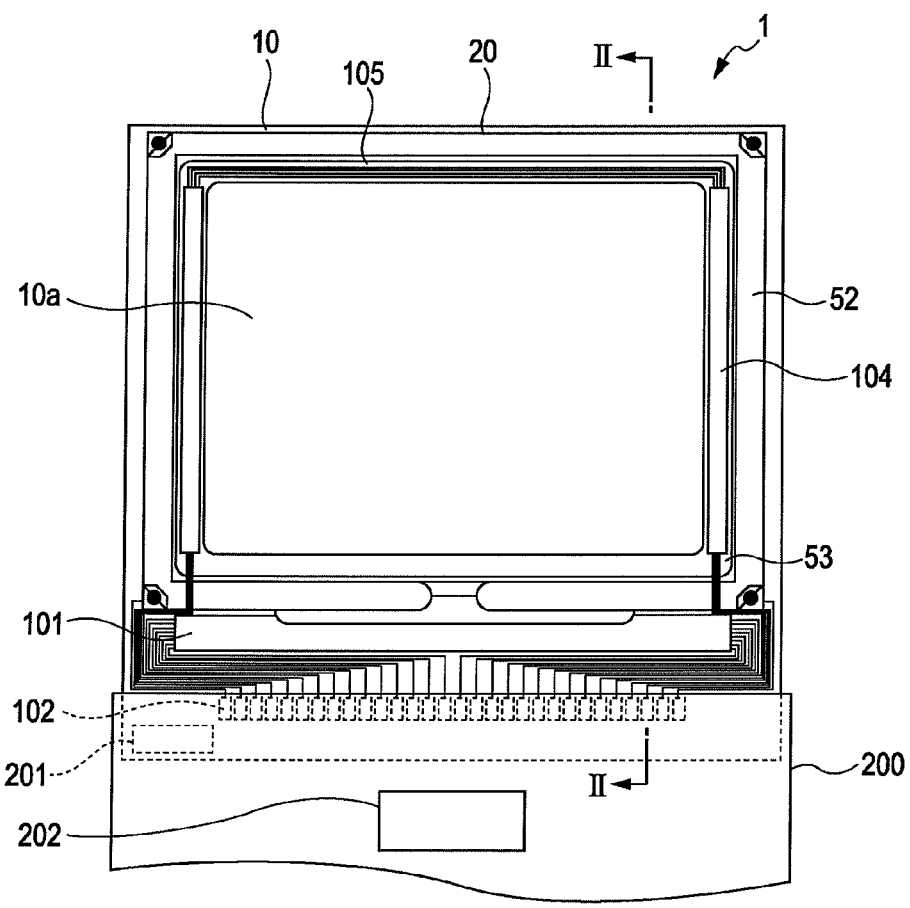
FIG. 1 is a plan view that schematically illustrates an example of the configuration of a liquid crystal device according to a first embodiment of the invention.
Figure 2:
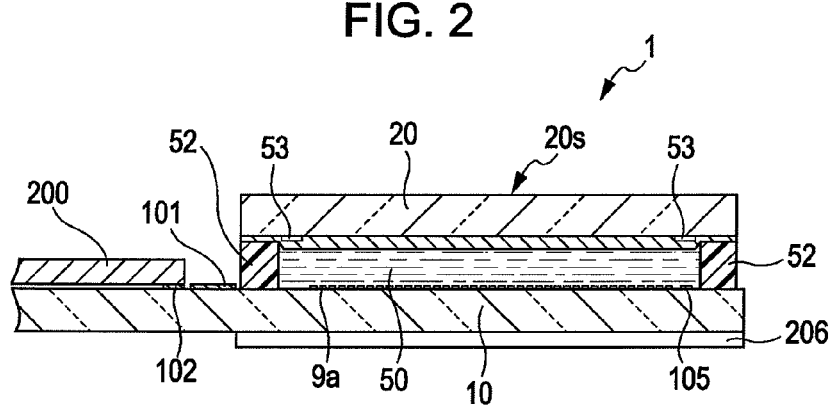
FIG. 2 is a sectional view taken along the line II-II of FIG. 1.

As illustrated in FIGS. 1 and 2, in the configuration of a liquid crystal device 1 according to the present embodiment of the invention, a TFT array substrate 10 and a counter substrate 20 are provided in such a manner that they face each other, that is, at positions opposite each other. The TFT array substrate 10 is a non-limiting example of a "first substrate" according to the invention, whereas the counter substrate 20 is a non-limiting example of a "second substrate" according to the invention. A liquid crystal layer 50 is sealed between the TFT array substrate 10 and the counter substrate 20. The TFT array substrate 10 and the counter substrate 20 are adhered to (e.g., bonded to) each other with the use of a sealant material 52 that is provided at a sealing region around an image display region 10a. The image display region 10a is a display area in which a plurality of pixel units (i.e., a plurality of pixels) is provided.

The sealant material 52 is made from, for example, an ultraviolet (UV) curable resin, a thermosetting resin, or the like, which functions to paste these substrates together. In the production process of the liquid crystal device, the sealant material 52 is applied onto the TFT array substrate 10 and subsequently hardened through an ultraviolet irradiation treatment, a heat treatment, or any other appropriate treatment. A gap material such as glass fibers, glass beads, or the like, are scattered in the sealant material 52 so as to set the distance (i.e., inter-substrate gap) between the TFT array substrate 10 and the counter substrate 20 at a predetermined gap value.

Inside the sealing region at which the sealant material 52 is provided, and in parallel therewith, a picture frame light-shielding film 53, which has a light-shielding property and defines the picture frame region of the image display region 10a, is provided on the counter substrate 20. Notwithstanding the above, a part or a whole of the picture frame light-shielding film 53 may be provided at the TFT-array-substrate (10) side as a built-in light-shielding film. A peripheral region surrounds the image display region 10a. In other words, in the configuration of the liquid crystal device 1 according to the present embodiment of the invention, an area that is farther than the picture frame light-shielding film 53 when viewed from the center of the TFT array substrate 10, that is, an area that is not inside but outside the picture frame light-shielding film 53, is defined as the peripheral region.

Among a plurality of sub-peripheral regions that make up the peripheral region described above, a data line driving circuit 101 and external circuit connection terminals 102 are provided at one sub-peripheral region which lies outside the sealing region at which the sealant material 52 is provided in such a manner that these data line driving circuit 101 and external circuit connection terminals 102 are provided along one of four sides of the TFT array substrate 10. A pair of scanning line driving circuits 104 is provided along two of four sides thereof that are not in parallel with the above-mentioned one side in such a manner that each of the scanning line driving circuits 104 is enclosed by the picture frame light-shielding film 53. In addition to the above, a plurality of electric wirings 105 is provided along the remaining one side (i.e., one that is parallel with the first-mentioned side) of the TFT array substrate 10 in such a manner that the plurality of electric wirings 105 is enclosed by the picture frame light-shielding film 53 so as to connect one of the pair of the scanning line driving circuits 104 that are provided outside the image display region 10a so as to extend along the second-mentioned two sides to the other thereof.

A sensor control circuit unit 201 is formed in the peripheral region over the TFT array substrate 10. The sensor control circuit unit 201 controls an optical sensor unit that includes a PIN diode. A more detailed explanation of the optical sensor unit will be given later. The external circuit connection terminals 102 are connected to the connection terminals of a flexible printed circuit (hereafter abbreviated as "FPC") 200, which is an example of a connecting means that provides an electric connection between external circuits and the liquid crystal device 1. The liquid crystal device 1 has a backlight. A backlight control circuit unit 202 controls the operation of the backlight of the liquid crystal device 1. The backlight control circuit unit 202 has an IC circuitry and the like that is formed on the FPC 200. It should be noted that each of the sensor control circuit unit 201 and the backlight control circuit unit 202 might be configured as a built-in circuit of the liquid crystal device 1. Or, alternatively, each of the sensor control circuit unit 201 and the backlight control circuit unit 202 may be configured as an external circuit that is separated from the liquid crystal device 1.

As illustrated in FIG. 2, a layered structure (i.e., lamination structure) that includes laminations of TFTs for pixel switching, which are driving/driver elements, and of wirings/lines such as scanning lines, data lines, and the like is formed on the TFT array substrate 10. Pixel electrodes 9a are formed at a layer above the lamination structure described above. On the other hand, a lamination/layer structure that includes a light-shielding means such as a light-shielding film 23 that has either a grid pattern or stripe pattern, though not limited thereto, is formed on the counter substrate 20.

The liquid crystal device 1 adopts a horizontal electric-field scheme for the driving of liquid crystal thereof. Specifically, the liquid crystal device 1 utilizes a horizontal electric field that is generated between pixel electrodes 9a and a common electrode in order to control the orientation state, that is, alignment state, of the liquid crystal layer 50. In the configuration of the liquid crystal device 1, the pixel electrodes 9a are formed on a certain layer over the TFT array substrate 10 thereof whereas the common electrode is formed on another layer over the TFT array substrate 10 thereof. The liquid crystal layer 50 is made of liquid crystal that consists of, for example, a mixture of one or more types of nematic liquid crystal element. A horizontal electric field that is generated between the pixel electrodes 9a and the common electrode provides a driving force to the liquid crystal layer 50. An image is displayed on a display surface 20s of the liquid crystal device 1. The display surface 20s is one of two surfaces of the counter substrate 20 that does not face the liquid crystal layer 50. In order to simplify explanation, a polarizing sheet (i.e., polarizing film) and a color filter are not illustrated in the drawing. If it is assumed that a polarizing sheet and a color filter are formed on the counter substrate 20, the upper-most surface layer of the liquid crystal device 1 constitutes its display surface.

The liquid crystal device 1 is provided with a backlight 206. As illustrated in the drawing, the backlight 206 is provided below the TFT array substrate 10. As understood from the above explanation and the drawing, the backlight 206 is provided at the back-panel side that is remotest from the display surface 20s. The backlight 206 is configured as a two-dimensional array of semiconductor light emission elements each of which constitutes a point light source as an example of a light emitting diode. The backlight 206 may be configured to include light emitting diodes such as organic electroluminescent (EL) elements or the like. Alternatively, the backlight 206 may be configured as a side-light-type light-source component that has a light-guiding body. In such a configuration, the light-guiding body of the backlight 206 receives light coming from a light source (light-source elements) that is provided at a side thereof and then outputs surface light (i.e., planar light).

It should be noted that other functional circuits may also be provided on the TFT array substrate 10 illustrated in FIGS. 1 and 2 in addition to driving circuits such as the above-described data line driving circuit 101, the scanning line driving circuit 104, and the like, including but not limited to, a sampling circuit that performs the sampling of an image signal that flows on an image signal line so as to supply the sampled signal to a data line, a pre-charge circuit that supplies a pre-charge signal having a predetermined voltage level to each of the plurality of data lines prior to the supplying of an image signal, a test circuit for conducting an inspection on the quality, defects, etc., of the electro-optical device (liquid crystal device) during the production process or before shipment, and the like.

1-2: General/Main Circuit Configuration of Liquid Crystal Device

Figure 3:
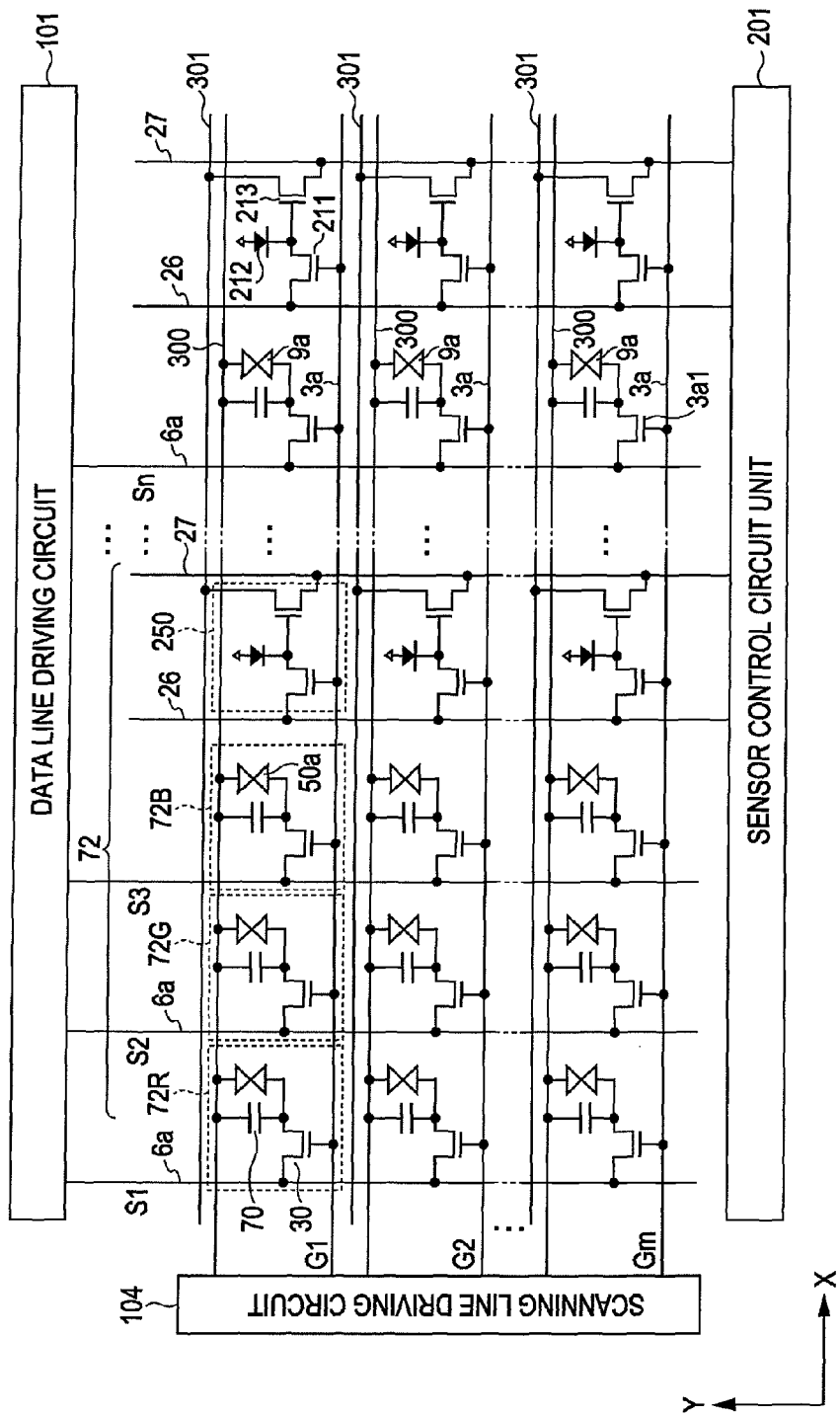
FIG. 3 is an equivalent circuit diagram that illustrates an example of constituent elements and wirings in a plurality of pixels that are arranged in a matrix pattern so as to constitute the image display region of a liquid crystal device according to the first embodiment of the invention.

Next, with reference to FIG. 3, the general/main circuit configuration of the liquid crystal device 1 is explained below. FIG. 3 is an equivalent circuit diagram that illustrates an example of constituent elements and wirings in a plurality of pixels that are arranged in a matrix pattern so as to constitute the image display region (i.e., image display area) 10a of the liquid crystal device 1 according to the present embodiment of the invention.

As illustrated in FIG. 3, each one of a plurality of pixel units 72 that are arranged in a matrix pattern to constitute the image display region 10a of the liquid crystal device 1 is made up of a set of sub pixel units (sub pixel elements), specifically, a red sub pixel unit 72R that displays a red color component, a green sub pixel unit 72G that displays a green color component, and a blue sub pixel unit 72B that displays a blue color component. With such a pixel array configuration, the liquid crystal device 1 is capable of displaying a color image.

Each of the sub pixel units 72R, 72G, and 72B has the pixel electrode 9a, a TFT 30, and a liquid crystal element 50a. The TFT 30 is electrically connected to the pixel electrode 9a so as to perform switching control on the pixel electrode 9a at the time of operation of the liquid crystal device 1. In this way, each of the TFT 30 functions as a switching element that selectively supplies an image signal to the corresponding one of the pixel electrodes 9a. The common electrode is electrically connected to a fixed-electric-potential line (i.e., fixed voltage line) 300. In each of the sub pixel units 72R, 72G, and 72B, a horizontal electric field that is generated because of a difference between the pixel electric potential of the pixel electrode 9a to which an image signal is supplied and the common electric potential of the common electrode that is electrically connected to the fixed-electric-potential line 300 provides a driving force to the liquid crystal element 50a.

Each of data lines 6a to which image signals are supplied is electrically connected to the source of the TFT 30. Image signals S1, S2, ..., and Sn that are written on the data lines 6a may be supplied respectively in the order of appearance herein (i.e., in the order of S1, S2, ..., and Sn) in a line sequential manner. Alternatively, an image signal may be supplied to each of a plurality of groups of the data lines 6a, where each group consists of a bundle of the data lines 6a adjacent to each other (one another).

Each of scanning lines 3a is connected to the gate of the TFT 30. The liquid crystal device 1 according to the present embodiment of the invention is configured to apply, at a predetermined timing and in a pulse pattern, scanning signals G1, G2, ..., and Gm to the scanning lines 3a in the order of appearance herein in a line sequential manner. Each of the pixel electrodes 9a is electrically connected to the drain (region/electrode) of the TFT 30. When the switch of the TFT 30, which functions as a switching element, is closed for a certain time period, the image signal S1, S2, ..., or Sn that is supplied through the data line 6a is written at a predetermined timing. After being written into liquid crystal via the pixel electrodes 9a, the image signals S1, S2, ..., and Sn having a predetermined level are held for a certain time period between the pixel electrode 9a and a counter electrode formed on the counter substrate 20.

Liquid crystal that is sealed in the liquid crystal layer 50 changes its orientation (i.e., alignment) and/or its order of molecular association depending on the level of a voltage that is applied thereto. By this means, it modulates light to realize a gradation display. Under a "normally-white" mode, the optical transmittance (i.e., light transmission factor) with respect to an incident light beam decreases in accordance with a voltage applied on a sub-pixel-by-sub-pixel basis (i.e., to each sub pixel), whereas, under a "normally-black" mode, the optical transmittance with respect to an incident light beam increases in accordance with a voltage applied on a sub-pixel-by-sub-pixel basis. Thus, when viewed as a whole, light having a certain contrast in accordance with an image signal is emitted from the liquid crystal device 1. In order to prevent the leakage of the image signals being held, a storage capacitor 70 is added in electrically parallel with the liquid crystal element 50a that is formed between the pixel electrode 9a and the common electrode.

The liquid crystal device 1 is provided with optical sensor units 250. Each of the pixel units 72 of the liquid crystal device 1 has the optical sensor unit 250. The optical sensor unit 250 is made up of, though not necessarily limited thereto, a PIN diode 212, a TFT 211, and a TFT 213. It should be noted that the PIN diode 212 is a non-limiting example of a "light-sensitive pickup element" according to the invention. The optical sensor units 250 of the liquid crystal device 1 are electrically connected to the sensor control circuit unit 201. Since the liquid crystal device 1 has such a configuration, the sensor control circuit unit 201 supplies a control signal that is used for controlling the operation of the optical sensor unit 250 to the optical sensor unit 250 via a sensor pre-charge control line 26. In addition, an output signal that contains information on the position of a pointing means that is detected by the optical sensor unit 250 is outputted to the sensor control circuit unit 201 via a sensor output control line 27.

The gate electrode of the TFT 211 is electrically connected to the scanning line 3a. The source electrode of the TFT 211 is electrically connected to the sensor pre-charge control line 26. The drain electrode of the TFT 211 is electrically connected to the PIN diode 212. In addition, the drain electrode of the TFT 211 is further electrically connected to the gate electrode of the TFT 213. The ON/OFF state of the TFT 211 is switched over therebetween by means of a control signal that is supplied thereto via the TFT scanning line 3a. A pre-charge voltage is supplied to the PIN diode 212 via the sensor pre-charge control line 26 and the TFT 211. A pre-charge signal pre-charges the PIN diode 212.

The gate electrode of the TFT 213 is electrically connected to the PIN diode 212. A voltage is generated in accordance with a change in the amount of electric charge that is accumulated in the PIN diode 212. The ON/OFF state of the TFT 213 switches over therebetween in accordance with a voltage that is generated in accordance therewith. Specifically, a change in the amount of electric charge that is accumulated in the PIN diode 212 occurs as a result of light that is detected by the PIN diode 212. Therefore, the driving state of the TFT 213 turns ON at the time when the PIN diode 212 detects a pointing means. An output signal that contains information on the position of the pointing object (i.e., pointing means), though not limited thereto, is outputted to the sensor output control line 27 via the TFT 213 as an amplified signal that is obtained by amplifying an electric potential of a signal line 301.

1-3: Configuration of Pixel Unit

Figure 4:
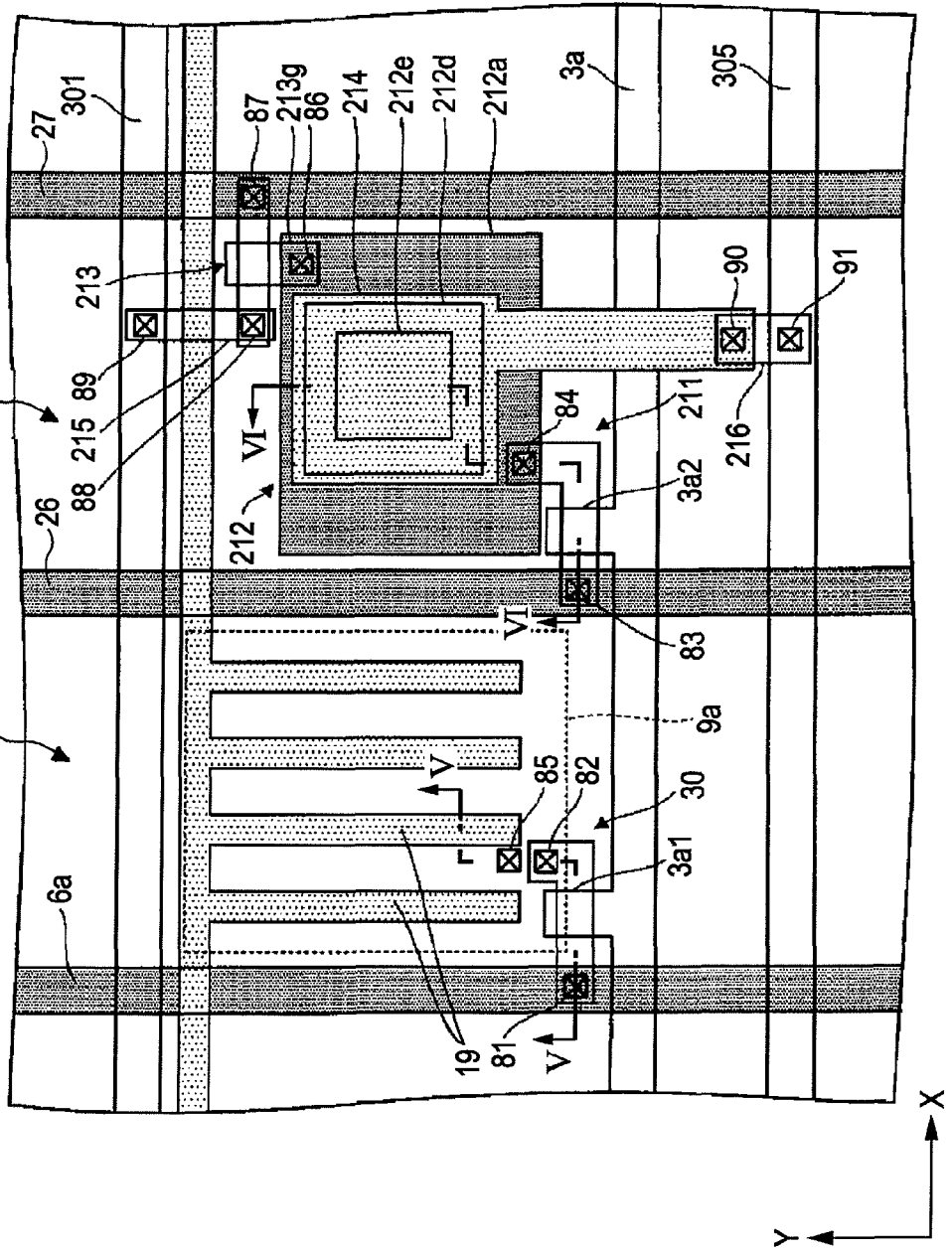
FIG. 4 is a plan view that schematically illustrates, in a close-up view, an example of the configuration of one of a plurality of pixels that are arrayed adjacent to one another over a TFT array substrate of a liquid crystal device according to the first embodiment of the invention, where a data line, a scanning line, a pixel electrode, and other lines/components are formed over the TFT array substrate thereof; specifically, this drawing schematically illustrates an example of the configuration of a sub pixel unit 72B and an optical sensor unit 250 thereof.
Figure 5:
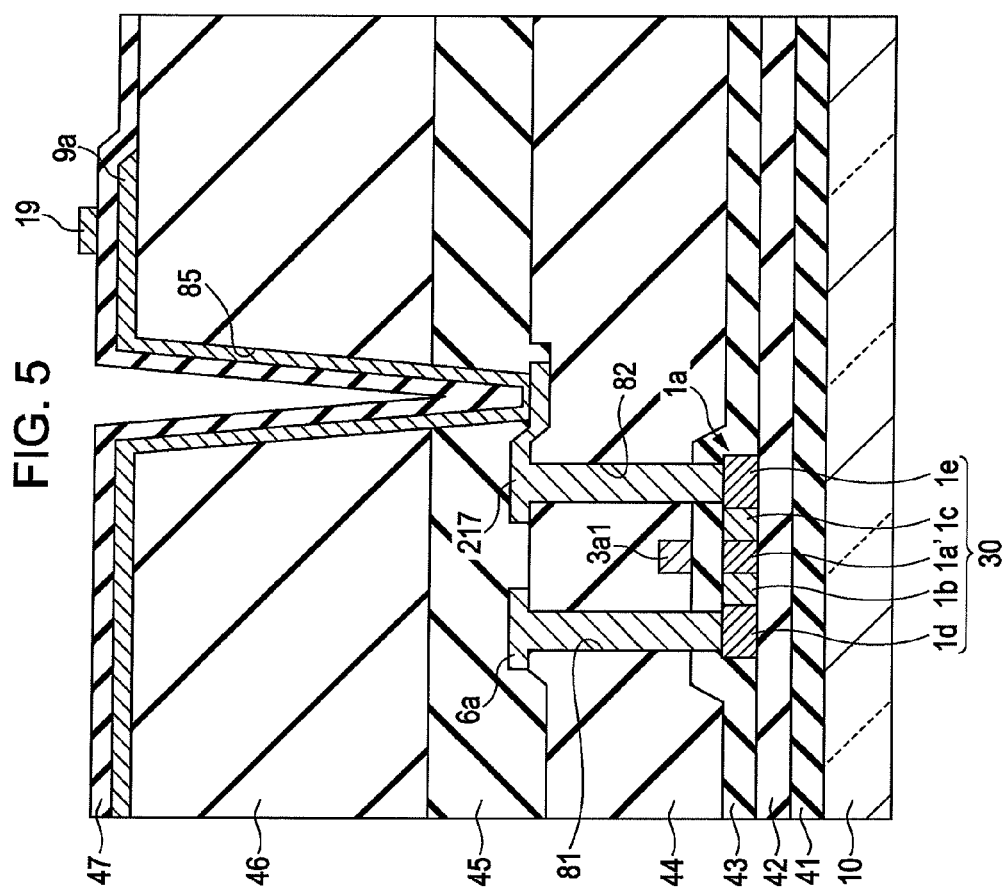
FIG. 5 is a sectional view taken along the line V-V of FIG. 4.
Figure 6:
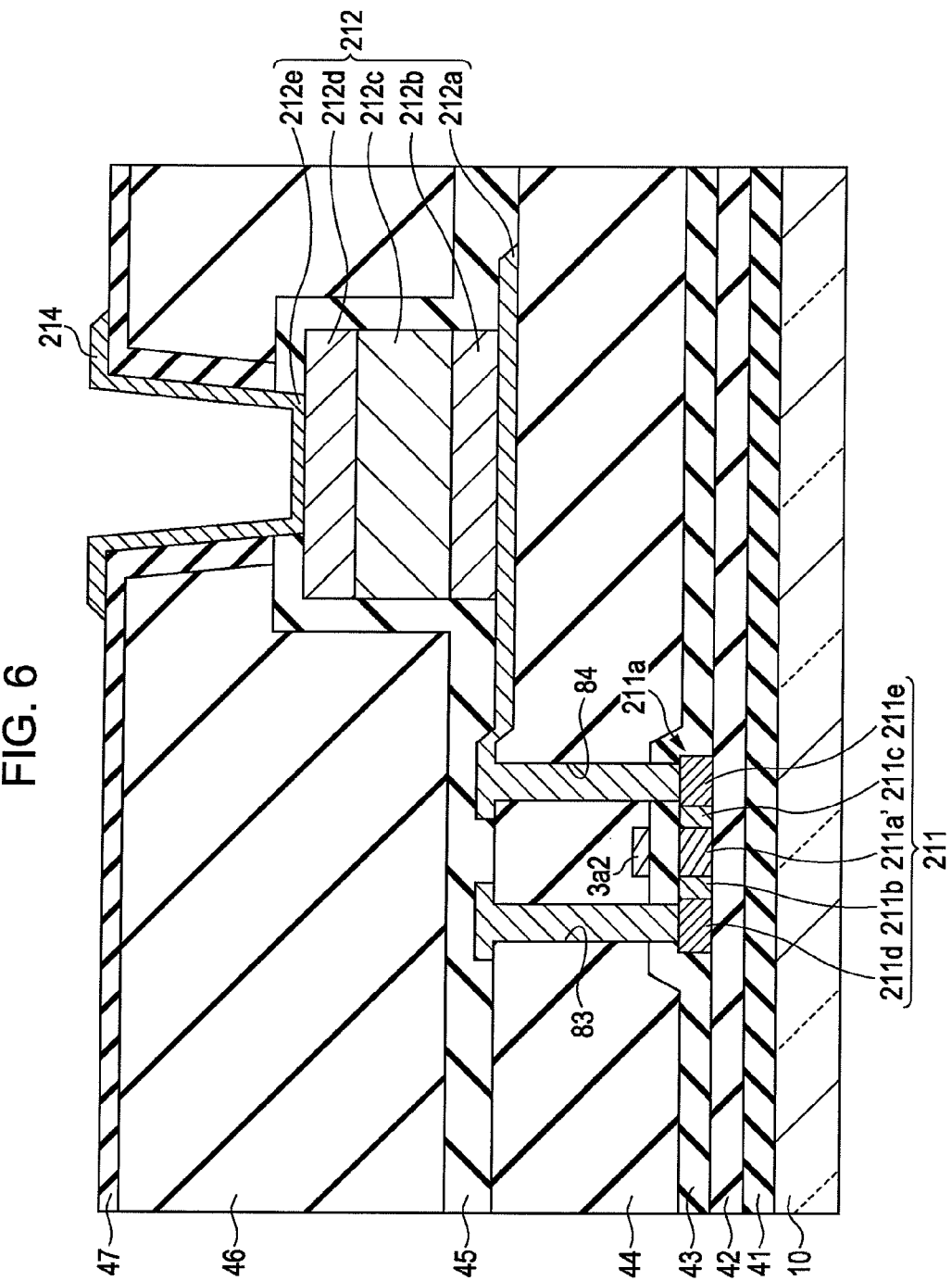
FIG. 6 is a sectional view taken along the line VI-VI of FIG. 4.

Next, with reference to FIGS. 4-6, the configuration of the sub pixel unit 72B and the optical sensor unit 250 is explained in detail below. FIG. 4 is a plan view that schematically illustrates an example of the configuration of the sub pixel unit 72B and the optical sensor unit 250 of the liquid crystal device 1 according to a first embodiment of the invention. FIG. 5 is a sectional view taken along the line V-V of FIG. 4. FIG. 6 is a sectional view taken along the line VI-VI of FIG. 4. In referring to FIGS. 4-6, it should be noted that different scales are used for layers/members so that each of the layers/members has a size that is easily recognizable in each of these drawings.

As illustrated in FIG. 4, the sub pixel unit 72B has the pixel electrode 9a, the contour/outline of which is shown as a dotted box therein. The pixel electrodes 9a are arrayed in a matrix pattern having rows extending in the X direction and columns extending in the Y direction over the TFT array substrate 10 of the liquid crystal device 1. The pixel electrode 9a is configured as a transparent electrode that is made of an electro-conductive (i.e., conductive) transparent material such as Indium Tin Oxide (ITO) or the like. The pixel electrode 9a is formed not only in the blue sub pixel unit 72B but also in the red sub pixel unit 72R and the green sub pixel unit 72G. Each of the data lines 6a is formed to extend vertically along a boundary between two pixel electrodes 9a that are arrayed adjacent to each other. Each of the scanning lines 3a is formed to extend horizontally along a boundary between two pixel electrodes 9a that are arrayed adjacent to each other. The data lines 6a and the scanning lines 3a extend in such a manner that they intersect with each other on the image display area 10a in a plan view. Each of the sensor pre-charge control lines 26 and the sensor output control lines 27 extends in a direction along which each of the data lines 6a extends, that is, the Y direction as illustrated in the drawing.

A common electrode 19 is configured as an electro-conductive transparent electrode that is made of an electro-conductive transparent material such as ITO or the like, which is the same as the configuration of the pixel electrode 9a described above. In a plan view, the common electrode 19 has the shape of a "comb" (or rake). Each of the comb-teeth of the common electrode 19 extends in the Y direction as shown in the drawing. The common electrode 19 overlaps the pixel electrode 9a in a plan view at a sub pixel region in which the sub pixel unit 72 is formed.

The source electrode of the TFT 30 is electrically connected to the corresponding data line 6a via a contact hole 81. On the other hand, the drain electrode of the TFT 30 is electrically connected to the corresponding pixel electrode 9a via contact holes 82 and 85. With such a configuration, an image signal that has been supplied to the TFT 30 from the data line driving circuit 101 via the data line 6a can be supplied to the pixel electrode 9a when the TFT 30 is operated in a switch ON state. The electric potential of the common electrode 19 is maintained at a fixed electric potential of the fixed-electric-potential line 300.

The source electrode of the TFT 211 is electrically connected to the sensor pre-charge control line 26 via a contact hole 83. On the other hand, the drain electrode of the TFT 211 is electrically connected to a lower electrode 212a of the PIN diode 212 via a contact hole 84. The gate electrode 3a2 of the TFT 211 is configured as a partial region of the scanning line 3a, where the partial region thereof protrudes (i.e., extends) therefrom in the Y direction. The drive ON/OFF state of the TFT 211 is switched over therebetween by means of a gate voltage, which is applied to the corresponding channel region thereof via the gate electrode 3a2.

An electro-conductive film (i.e., conductive film) 214 includes an upper electrode 212e of the PIN diode 212 as a portion thereof. The electro-conductive film 214 extends in the Y direction. The electro-conductive film 214 is electrically connected to electric wirings 305 via a contact hole 90, a relay layer 216, and a contact hole 91. The electric potential of the electric wirings 305 is maintained at a fixed electric potential by a power source that is not shown in the drawing. The electric potential of the upper electrode 212e of the PIN diode 212 is also maintained at a fixed electric potential.

The source electrode of the TFT 213 is electrically connected to the signal line 301 via a contact hole 89, a relay layer 215, and a contact hole 88. The drain electrode of the TFT 213 is electrically connected to the sensor output control line 27 via a contact hole 87. The gate electrode (213g) of the TFT 213 is electrically connected to the lower electrode 212a of the PIN diode 212 via a contact hole 86.

As will be explained in detail later, the PIN diode 212 has the lower electrode 212a and the upper electrode 212e. These electrodes contact the upper surface of an element body and a lower surface thereof, respectively. The lower electrode 212a of the PIN diode 212 is electrically connected to the drain electrode of the TFT 211 via the contact hole 84. Therefore, when incident light is irradiated on the PIN diode 212 during the operations of the TFT 211 and the TFT 213, a signal is outputted onto the sensor signal control line (i.e., sensor output control line) 27 on the basis of a photocurrent that is generated in the PIN diode 212 in accordance the irradiated light.

As illustrated in FIGS. 5 and 6, the liquid crystal device 1 is provided with insulating films 41, 42, 43, 44, 45, 46, and 47, which are deposited one over another so as to constitute a lamination structure formed over the TFT array substrate 10. Each of the aforementioned thin film transistors (TFT) 30 and 211 is "embedded" (i.e., formed) in the lamination structure that is made of layers of these insulating films 41, 42, 43, 44, 45, 46, and 47.

As illustrated in FIG. 5, the TFT 30 has an LDD structure. In such an LDD structure, the TFT 30 has a semiconductor layer 1a that is made of polysilicon or the like, which is made up of a channel region 1a', a source region (i.e., a highly doped source region) 1d, a drain region (i.e., a highly doped drain region) 1e, an LDD region (a lightly doped source region) 1b, and another LDD region (a lightly doped drain region) 1c. The LDD region 1b has a relatively low electric resistance in comparison with that of the source region 1d. On the other hand, the LDD region 1c has a relatively low electric resistance in comparison with that of the drain region 1e. Since the TFT 30 has an LDD structure, it is possible to reduce the amount/level of an OFF-state current that flows in the LDD (lightly doped source) region 1b and the LDD (lightly doped drain) region 1c during the non-operating time of the TFT 30, and also to suppress the decrease in the amount/level of an ON-state current that flows during the operating time of the TFT 30. Thus, taking advantage of the LDD structure and the significantly reduced (i.e., almost no) optical leakage current, the liquid crystal device 1 offers image display with enhanced picture quality.

The source region 1d of the TFT 30 is electrically connected to the data line 6a via the contact hole 81. On the other hand, the drain region 1e of the TFT 30 is electrically connected to, via the contact hole 82, the pixel electrode 9a, which is formed so as to extend inside the contact hole 85 under the insulating film 47. The gate electrode 3a1 is formed in such a manner that it overlaps the channel region 1a' of the semiconductor layer 1a of the TFT 30 in a plan view with the insulating film 43 being interposed therebetween. The common electrode 19 is formed on the insulating film 47. Therefore, in the layer structure of the liquid crystal device 1, the pixel electrode 9a is formed on one layer over the TFT array substrate 10 whereas the common electrode 19 is formed on another layer over the TFT array substrate 10, which is not the same layer as that of the pixel electrode 9a, with the insulating film 47 being sandwiched therebetween as an interposed layer.

The TFT 211 is shown in FIG. 6. As illustrated therein, as in the configuration of the TFT 30 that is explained above, the TFT 211 also has a semiconductor layer 211a that is made up of a channel region 211a', a source region (i.e., a highly doped source region) 211d, a drain region (i.e., a highly doped drain region) 211e, an LDD region (a lightly doped source region) 211b, and another LDD region (a lightly doped drain region) 211c.

The PIN diode 212 has the aforementioned lower electrode 212a, an N-type semiconductor layer 212b, a light sensitive (i.e., light reception) layer 212c that is made of polysilicon, a P-type semiconductor layer 212d, and the aforementioned upper electrode 212e. The lower electrode 212a, the N-type semiconductor layer 212b, the light reception layer 212c, the P-type semiconductor layer 212d, and the upper electrode 212e are deposited in the order of appearance herein over the insulating film 44. Having such a layer-deposition configuration, the PIN diode 212 is capable of detecting reflected light, which has been reflected by a pointing means (i.e., pointing object) such as a finger of a user or the like that points to the display surface 20s in the image display area 10a, or external/incident light (such as solar light, indoor illumination light, though not limited thereto) that comes from the outside without being blocked/shielded by the pointing means.

As has already been mentioned above, the lower electrode 212a of the PIN diode 212 is electrically connected to the drain electrode of the TFT 211 via the contact hole 84. The upper electrode 212e of the PIN diode 212 constitutes a part of the electro-conductive film 214, which is formed on the insulating film 47. That is, in the configuration of the liquid crystal device 1 according to the present embodiment of the invention, the upper electrode 212e of the PIN diode 212 is formed in the same layer as that of the common electrode 19 over the TFT array substrate 10.

Therefore, in the manufacturing process of the liquid crystal device 1, it is possible to form the upper electrode 212e of the PIN diode 212 and the common electrode 19 in the same single electrode formation process, which offers a more simplified and thus efficient production thereof in comparison with a case where the upper electrode 212e of the PIN diode 212 is manufactured in one electrode formation process whereas the common electrode 19 is manufactured in another electrode formation process.

The upper electrode 212e of the PIN diode 212 has transparency because each of the pixel electrode 9a and the common electrode 19 is configured as a transparent electrode. Being made of a transparent electrode, neither the pixel electrode 9a nor the common electrode 19 narrows an open region (i.e., open area) over the TFT array substrate 10, which is an active area in each pixel through which light can be transmitted for image display without being shut off thereby. Moreover, incident light that has passed through the display surface 20s to enter the PIN diode 212 reaches the light reception layer 212c of the PIN diode 212 without being shut off by the upper electrode 212e thereof, which is also configured as a transparent electrode. Therefore, the liquid crystal device 1 according to the present embodiment of the invention is capable of offering an enhanced sensitivity in the detection of a pointing means that is performed by the PIN diodes 212 thereof without sacrificing the performance and quality of image display.

In addition, as understood from FIGS. 5 and 6, in the configuration of the liquid crystal device 1, the lower electrode 212a of the PIN diode 212 is formed in the same layer as that of the electro-conductive film 217, which is deposited on the insulating film 44, over the TFT array substrate 10. Thus, the liquid crystal device 1 according to the present embodiment of the invention offers a more simplified and thus efficient production process because it is possible to manufacture the lower electrode 212a of the PIN diode 212 in (i.e., by utilizing) the formation process of the electro-conductive film 217.

Unlike the upper electrode 212e thereof, the lower electrode 212a of the PIN diode 212 is made of an opaque (i.e., non-transparent) electro-conductive material. That is, as an additional function thereof, the lower electrode 212a of the PIN diode 212 serves as a light-shielding film, which blocks light-source light emitted from the backlight 206. Thanks to the presence of the light-shielding lower electrode 212a thereof, it is possible to significantly reduce any undesirable irradiation of such light-source light coming from the backlight 206 onto the PIN diode 212 at the time of display of an image in the image display area 10a. Having such a configuration, the liquid crystal device 1 according to the present embodiment of the invention ensures the accurate detection of a pointing object by means of the PIN diodes 212 thereof.

To sum it up, the liquid crystal device 1 according to the present embodiment of the invention offers the following advantageous effects of the invention, though not necessarily limited thereto; that is, in addition to the advantage of its simpler manufacturing process, the liquid crystal device 1 according to the present embodiment of the invention is capable of offering an enhanced sensitivity in the detection, which is performed by the PIN diodes 212 thereof, of external light (i.e., incident light) that comes from the outside without being blocked/shielded by the pointing means that points to the display surface 20s and/or light that has been reflected by the pointing means without sacrificing the performance and quality of image display because an open active area in each pixel through which light can be transmitted for image display is not narrowed.

2: Second Embodiment

Figure 7:
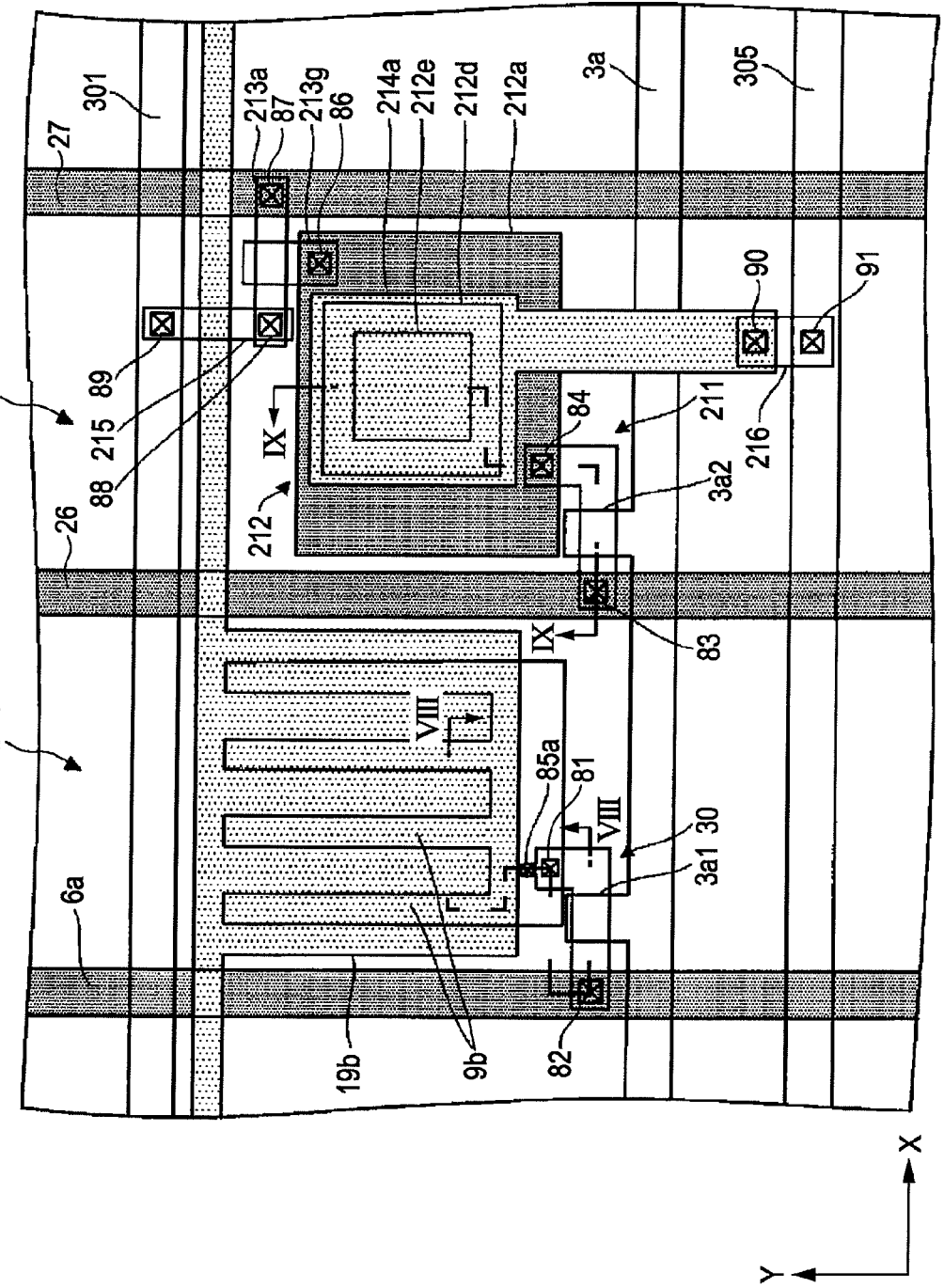
FIG. 7 is a plan view that schematically illustrates, in a close-up view, an example of the configuration of one of a plurality of pixels that are arrayed adjacent to one another over a TFT array substrate of a liquid crystal device according to a second embodiment of the invention, where a data line, a scanning line, a pixel electrode, and other lines/components are formed over the TFT array substrate thereof; specifically, this drawing schematically illustrates an example of the configuration of a sub pixel unit 72B-1 and the optical sensor unit 250 thereof.
Figure 8:
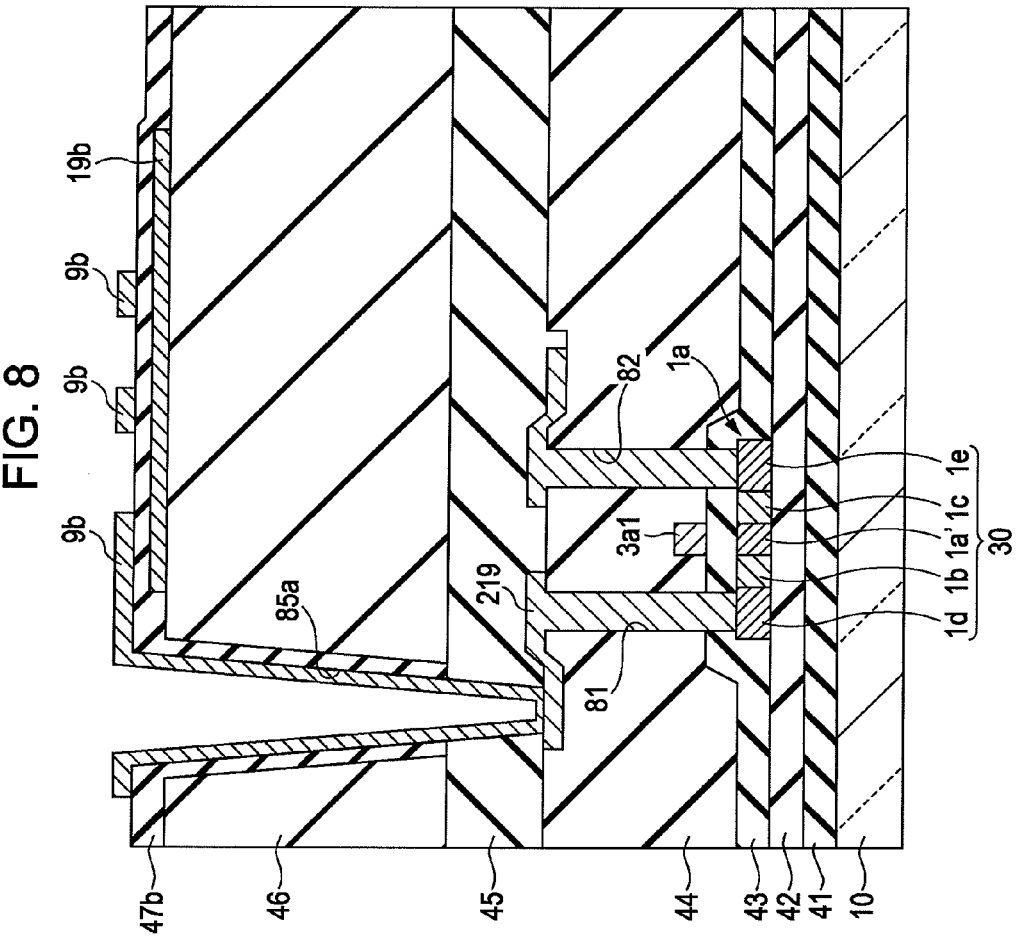
FIG. 8 is a sectional view taken along the line VIII-VIII of FIG. 7.
Figure 9:
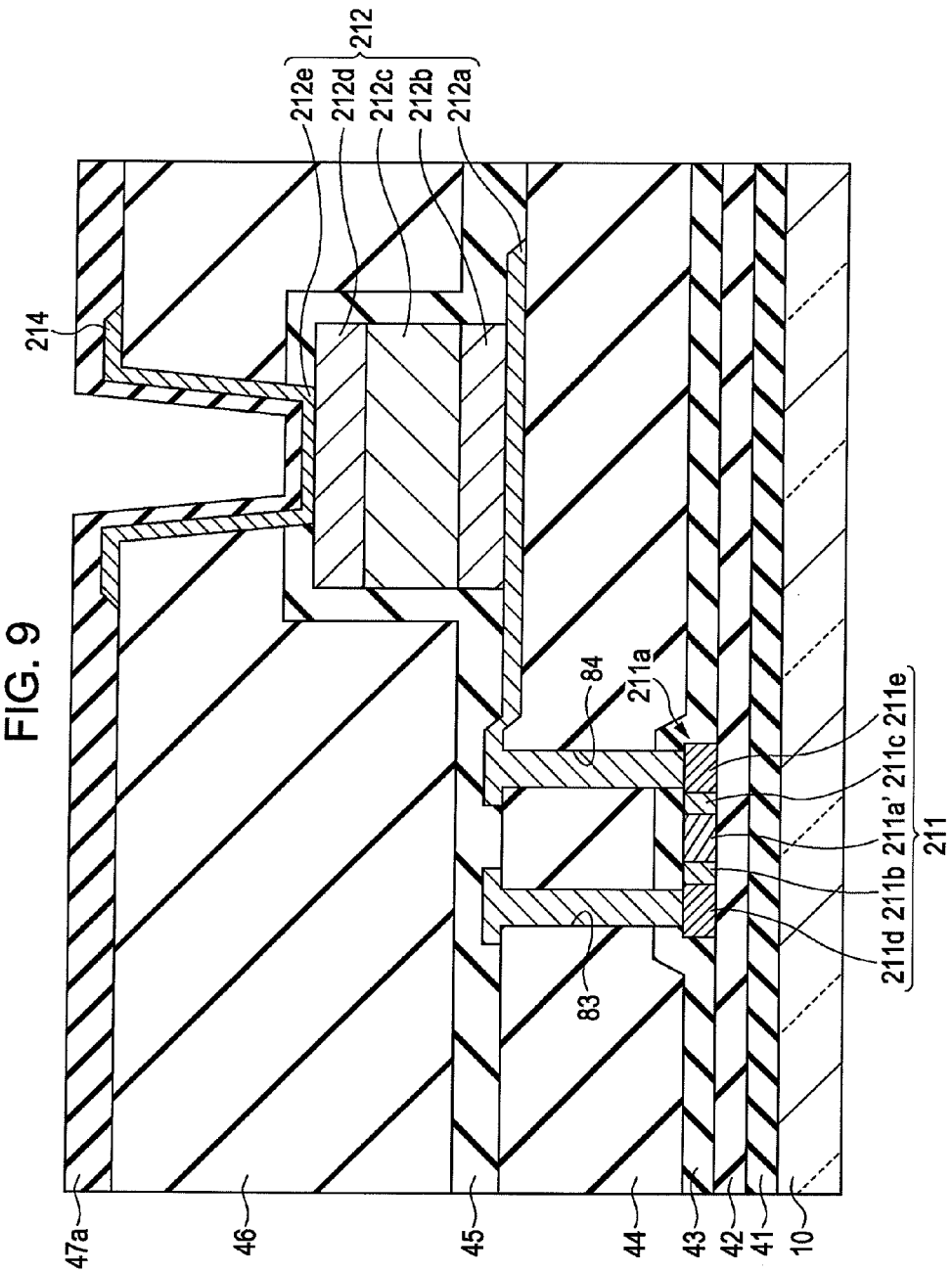
FIG. 9 is a sectional view taken along the line IX-IX of FIG. 7.

Next, with reference to FIGS. 7-9, a liquid crystal device according to a second embodiment of the invention is explained below. FIG. 7 is a plan view that schematically illustrates an example of the configuration of the sub pixel unit 72B-1 and the optical sensor unit 250 of a liquid crystal device according to a second embodiment of the invention. FIG. 8 is a sectional view taken along the line VIII-VIII of FIG. 7. FIG. 9 is a sectional view taken along the line IX-IX of FIG. 7. In the following description, the same reference numerals are assigned to the same components as those of the liquid crystal device 1 according to the first embodiment of the invention described above, and detailed explanation thereof is omitted.

As illustrated in FIG. 7, the sub pixel unit 72B-1 has the pixel electrode 9b. The pixel electrode 9b of the sub pixel unit 72B-1 is electrically connected to the TFT 30 thereof via two contact holes, that is, the contact hole 81 and a contact hole 85a. In a plan view, the pixel electrode 9b has a shape that resembles a comb (or rake). Each of the comb-teeth of the pixel electrode 9b extends in the Y direction as shown in the drawing. The liquid crystal device according to the present embodiment of the invention adopts a horizontal electric-field scheme for the driving of liquid crystal thereof. Specifically, the liquid crystal device according to the present embodiment of the invention utilizes a horizontal electric field that is generated between the pixel electrodes 9b and the common electrode 19 in order to drive the liquid crystal layer 50, that is, in order to control the orientation/alignment state of the liquid crystal layer 50. In the layer structure of the liquid crystal device according to the present embodiment of the invention, the pixel electrode 9b is formed on one layer over the TFT array substrate 10 whereas the common electrode 19 is formed on another layer over the TFT array substrate 10, which is not the same layer as that of the pixel electrode 9b. The liquid crystal device according to the present embodiment of the invention displays a desired image in the image display area 10a thereof by utilizing such a horizontal electric field.

As shown in FIG. 8, specifically, the pixel electrode 9b is formed on a certain layer (upper layer) that is not the same as that (lower layer) of the common electrode 19 with the insulating film 47b being sandwiched therebetween as an interposed layer. The pixel electrode 9b extends along the inner/side wall of the contact hole 85a. The pixel electrode 9b is electrically connected to an electro-conductive film 219, which is electrically connected to the TFT 30 via the contact hole 81.

As shown in FIG. 9, an electro-conductive film 214a is formed under the insulating film 47a. A portion of the electro-conductive film 214a constitutes the upper electrode 212e of the PIN diode 212.

Thus, the liquid crystal device according to the present embodiment of the invention offers a more simplified and thus efficient production process, which is the same advantage as that offered by the liquid crystal device 1 according to the first embodiment of the invention described above, because it is possible to manufacture the upper electrode 212e of the PIN diode 212 in the formation process of the common electrode 19b.

3: Third Embodiment

Figure 10:
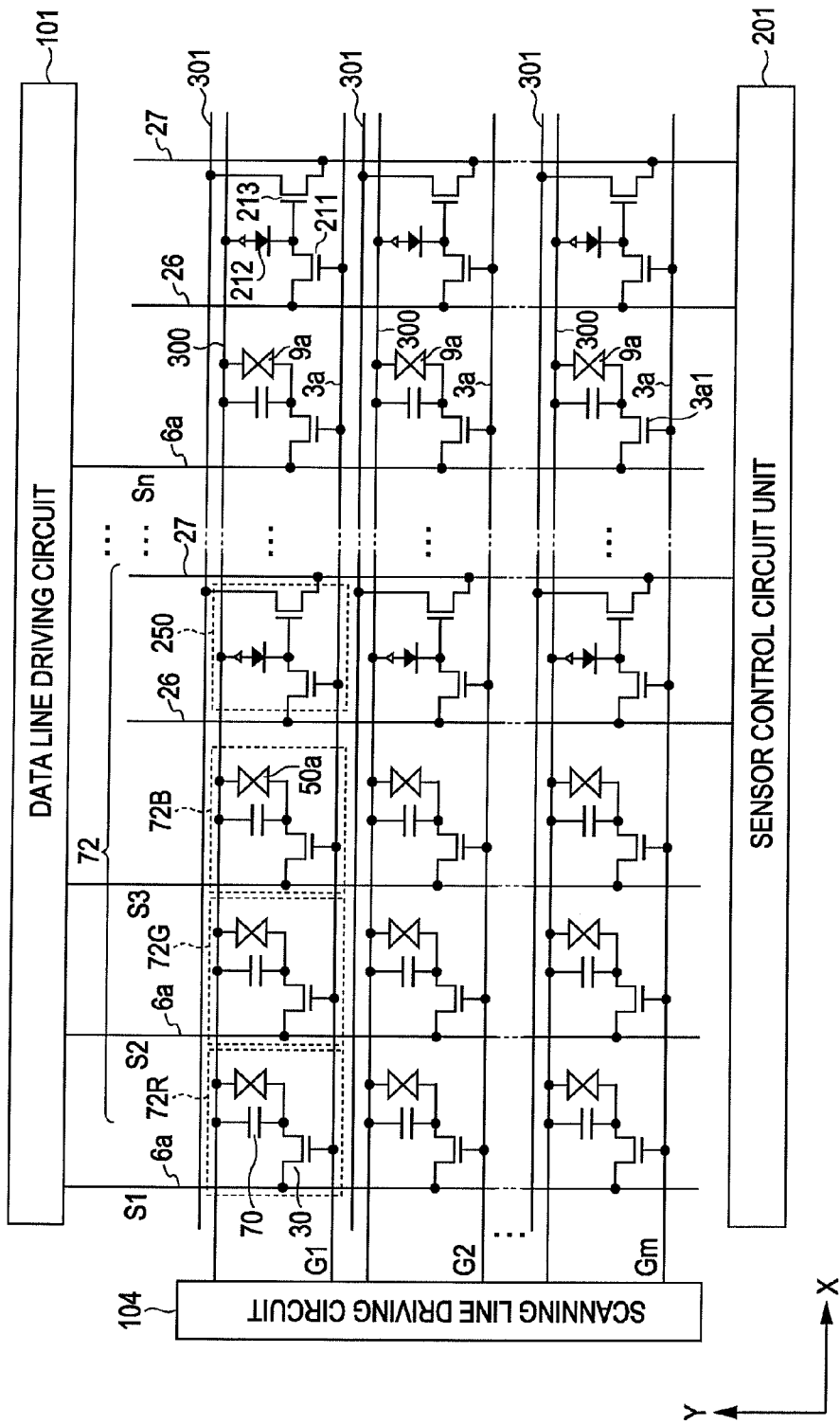
FIG. 10 is an equivalent circuit diagram that illustrates an example of constituent elements and wirings in a plurality of pixels that are arranged in a matrix pattern so as to constitute the image display region of a liquid crystal device according to a third embodiment of the invention.
Figure 11:
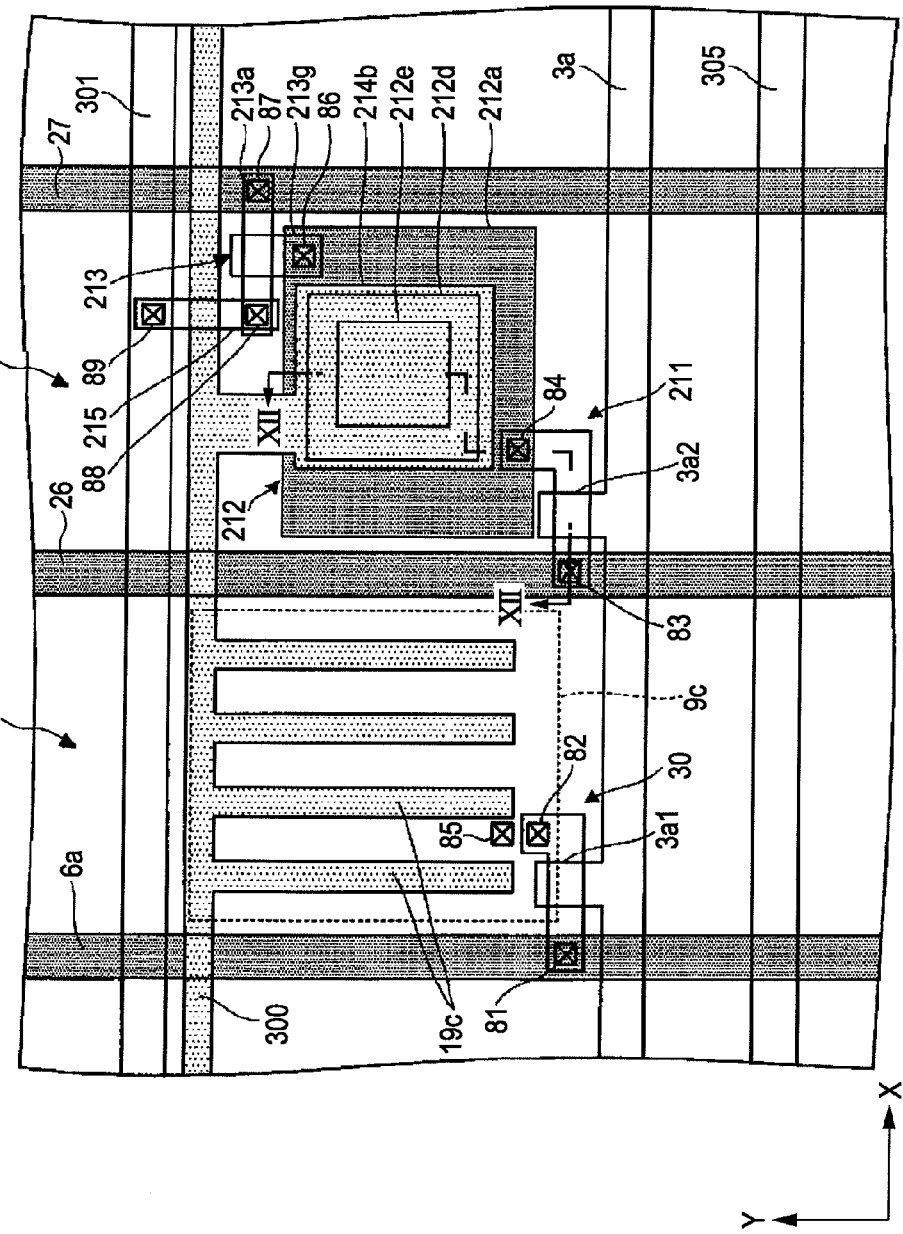
FIG. 11 is a plan view that schematically illustrates, in a close-up view, an example of the configuration of one of a plurality of pixels that are arrayed adjacent to one another over a TFT array substrate of a liquid crystal device according to a third embodiment of the invention, where a data line, a scanning line, a pixel electrode, and other lines/components are formed over the TFT array substrate thereof; specifically, this drawing schematically illustrates an example of the configuration of a sub pixel unit 72B-2 and the optical sensor unit 250 thereof.
Figure 12:
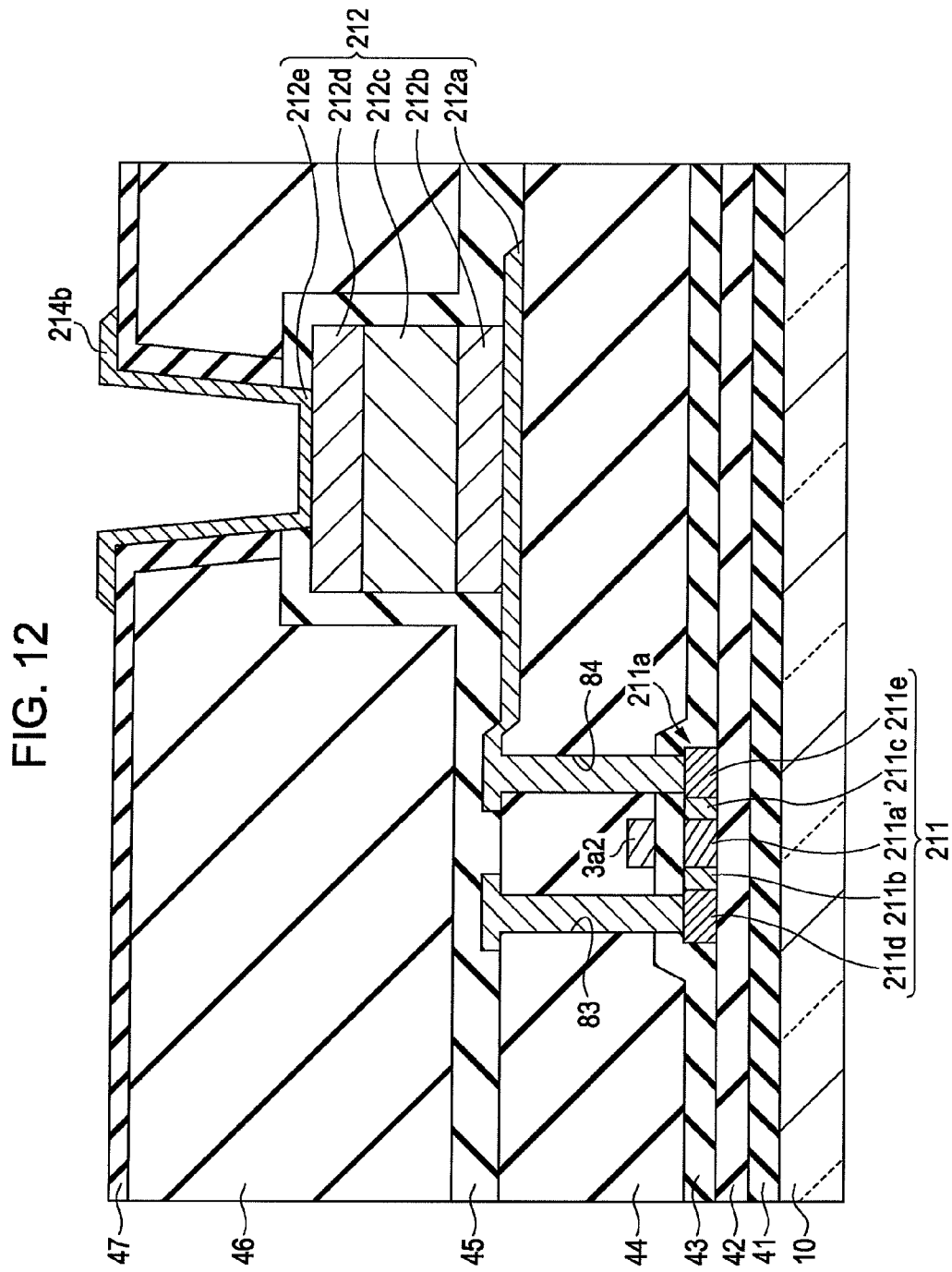
FIG. 12 is a sectional view taken along the line XII-XII of FIG. 11.

Next, with reference to FIGS. 10-12, a liquid crystal device according to a third embodiment of the invention is explained below. FIG. 10 is an equivalent circuit diagram that illustrates an example of constituent elements and wirings in a plurality of pixels that are arranged in a matrix pattern so as to constitute the image display region 10a of a liquid crystal device according to the present embodiment of the invention. FIG. 11 is a plan view that schematically illustrates an example of the configuration of the sub pixel unit 72B-2 and the optical sensor unit 250 of a liquid crystal device according to a third embodiment of the invention. FIG. 12 is a sectional view taken along the line XII-XII of FIG. 11.

The liquid crystal device according to the third embodiment of the invention illustrated in FIG. 10 differs from the above-described liquid crystal device according to the first or second embodiment of the invention in that one electrode of the PIN diode 212 is electrically connected to the fixed-electric-potential line 300.

As illustrated in FIG. 11, the sub pixel unit 72B-2 has a common electrode 19c and a pixel electrode 9c. An electro-conductive film 214b, which includes the upper electrode 212e of the PIN diode 212 as a part thereof, is electrically connected to the fixed-electric-potential line 300 that extends in the X direction as shown in the drawing. The common electrode 19c is also electrically connected to the fixed-electric-potential line 300. The pixel electrode 9c is electrically connected to the data line 6a via the contact holes 82 and 85 as well as via the TFT 30, that is, with the TFT 30 being interposed therebetween. As the ON/OFF state of the TFT 30 switches over, an electric potential that is in accordance with an image signal is supplied to the pixel electrode 9c in a switched manner.

In the configuration of the liquid crystal device according to the present embodiment of the invention, the electro-conductive film 214b shown in FIG. 12 is formed in the same layer as that of the common electrode 19c, which is formed on the insulating film 44, over the TFT array substrate 10. The electric potential of the upper electrode 212e of the PIN diode 212 is maintained at a fixed electric potential that is equal to the fixed electric potential of the fixed-electric-potential line 300. The pixel electrode 9c, which is not shown in FIG. 12, is formed under the insulating film 47a.

Thus, the liquid crystal device according to the present embodiment of the invention offers a more simplified and thus efficient production process, which is the same advantage as that offered by the liquid crystal device according to the first and second embodiments of the invention, because it is possible to manufacture the upper electrode 212e of the PIN diode 212 in the formation process of the common electrode.

In the configuration of a liquid crystal device according to the first, second, and third embodiments of the invention described above, it is explained that the upper electrode of a PIN diode and a common electrode are formed in the same single layer. However, the layer configuration of the liquid crystal device according to the invention is not limited to such an example. For example, it may be modified so that the upper electrode of a PIN diode is formed in the same layer as that of a pixel electrode.

4: Electronic Apparatus

Next, with reference to FIGS. 13 and 14, an exemplary embodiment of an electronic apparatus that is provided with the liquid crystal device described above is explained below.

Figure 13:
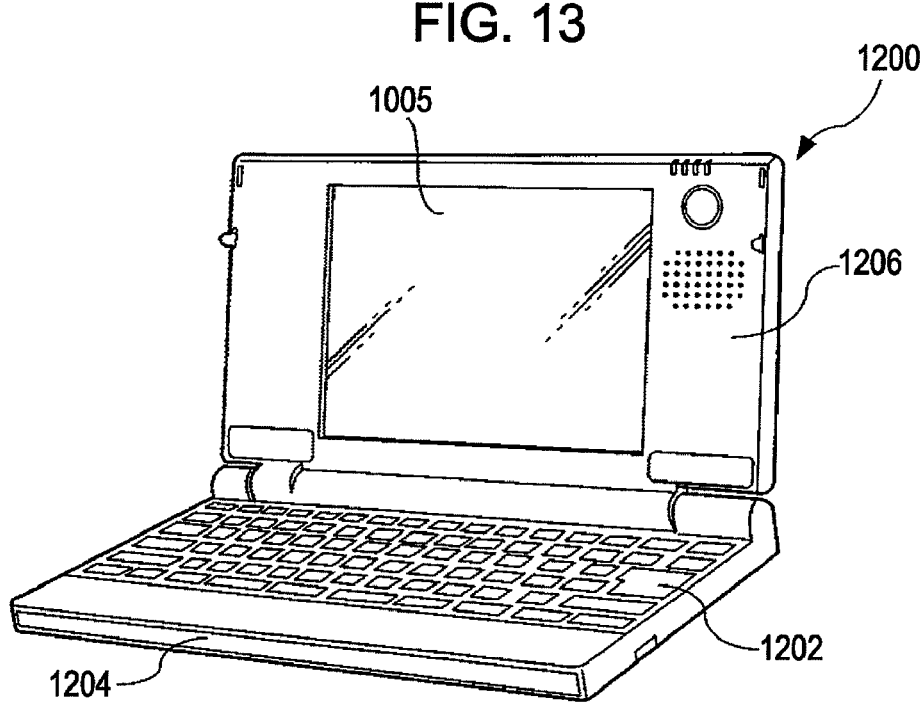
FIG. 13 is a perspective view that schematically illustrates an example of an electronic apparatus according to an exemplary embodiment of the invention.
Figure 14:
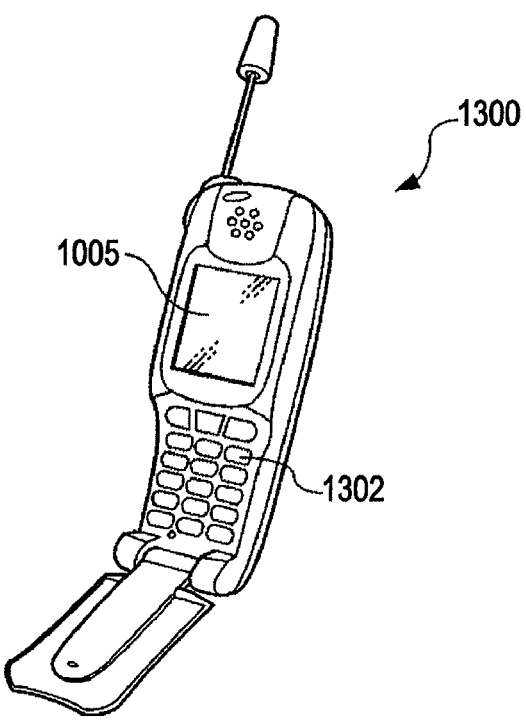
FIG. 14 is a perspective view that schematically illustrates another example of an electronic apparatus according to an exemplary embodiment of the invention.

FIG. 13 is a perspective view that schematically illustrates an example of a mobile personal computer to which the liquid crystal device described above is applied. As illustrated in FIG. 13, a personal computer 1200 is made up of a computer main assembly 1204, which is provided with a keyboard 1202, and a liquid crystal display unit 1206 to which the above-described liquid crystal device is applied. The liquid crystal display unit 1206 is mainly made up of a liquid crystal panel 1005 and a backlight. The backlight is provided on the rear face of the liquid crystal panel 1005. The liquid crystal device according to the foregoing exemplary embodiment of the invention makes it possible to offer a touch-panel function that allows a user to input a variety of kinds of information in a reliable manner even under optically variable ambient conditions where the optical intensity of external light is subject to change. Thanks to the unique features of the liquid crystal device according to the foregoing exemplary embodiment of the invention, it is possible to build such a touch-sensitive display unit in the mobile personal computer 1200, which is a non-limiting example of a variety of electronic apparatuses to which the invention can be applied, without requiring any complex manufacturing process.

Next, an explanation is given below of another exemplary implementation of the invention where the liquid crystal device described above is applied to a mobile phone. FIG. 14 is a perspective view that schematically illustrates a mobile phone, which is an example of an electronic apparatus according to the present embodiment of the invention. As illustrated in FIG. 14, a mobile phone 1300 is provided with a reflective-type liquid crystal device 1005, which has the same configuration as that of the liquid crystal device described above, together with a plurality of manual operation buttons 1302. The liquid crystal device according to the foregoing exemplary embodiment of the invention makes it possible to offer a touch-panel function that allows a user to input a variety of kinds of information in a reliable manner by using a pointing means as an inputting object. Specifically, the liquid crystal device according to the foregoing exemplary embodiment of the invention is capable of detecting a pointing means such as a finger of a user, though not limited thereto, which points to an image display surface on which an image is displayed, with significantly enhanced detection performance. Thanks to the unique features of the liquid crystal device according to the foregoing exemplary embodiment of the invention, it is possible to build such a touch-sensitive display unit in the mobile phone 1300, which is a non-limiting example of a variety of electronic apparatuses to which the invention can be applied, without requiring any complex manufacturing process.

What is claimed is:

1. A liquid crystal device comprising:
   a first substrate and a second substrate that are disposed to face each other;
   a transparent pixel electrode formed on the first substrate that is provided in each of a plurality of pixels that constitute a display area;
   a transparent common electrode that is formed on the first substrate;
   an insulating film that is disposed between the transparent pixel electrode and the transparent common electrode;
   a liquid crystal layer that is sandwiched between the transparent common electrode and the second substrate, the liquid crystal layer containing liquid crystal molecules that are driven by electric field that is generated in accordance with a difference between the electric potential of the pixel electrode and the electric potential of the common electrode; and
   a light-sensitive pickup element that is formed in the display area over the first substrate, the light-sensitive pickup element having an upper electrode that is formed in the same layer as that of either the pixel electrode or the common electrode.

2. The liquid crystal device according to claim 1, wherein the upper electrode is formed in the same layer as that of the common electrode.

3. The liquid crystal device according to claim 1, wherein the light-sensitive pickup element has a lower electrode that is formed in the same layer as that of an electro-conductive layer that is electrically connected to a pixel-switching element.

4. The liquid crystal device according to claim 1, wherein a lower electrode of the light-sensitive pickup element has an additional function of a light-shielding film that shuts off light-source light that is emitted from a light source provided under the light-sensitive pickup element.

5. An electronic apparatus that is provided with the liquid crystal device according to claim 1.

6. The liquid crystal device according to claim 1, wherein the insulating film is a solid material.

7. A liquid crystal device comprising:
   a first substrate and a second substrate that are disposed to face each other;
   a transparent pixel electrode that is provided in each of a plurality of pixels that constitute a display area and formed on the first substrate;
   a transparent common electrode that is formed on the first substrate;
   an insulating film that is formed on the first substrate and disposed between the transparent pixel electrode and the transparent common electrode;
   a liquid crystal layer that is sandwiched between the first substrate and the second substrate, the liquid crystal layer containing liquid crystal molecules that are driven by electric field that is generated in accordance with a difference between the electric potential of the pixel electrode and the electric potential of the common electrode; and
   a light-sensitive pickup element that is formed in the display area over the first substrate, the light-sensitive pickup element having an upper electrode that is formed in the same layer as that of either the pixel electrode or the common electrode.

\* \* \* \* \*